(12) United States Patent
Chung

(10) Patent No.: US 7,404,096 B2
(45) Date of Patent: Jul. 22, 2008

(54) MICROPROCESSOR FOR REDUCING LEAKAGE POWER AND METHOD THEREOF

(75) Inventor: Sung-Woo Chung, Seoul (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 233 days.

(21) Appl. No.: 10/957,617

(22) Filed: Oct. 5, 2004

(65) Prior Publication Data

US 2005/0149772 A1 Jul. 7, 2005

(30) Foreign Application Priority Data

Jan. 2, 2004 (KR) ................ 10-2004-0000024

(51) Int. Cl.
*G06F 1/20* (2006.01)
(52) U.S. Cl. ..................... 713/323; 713/324
(58) Field of Classification Search ............... 713/323, 713/324
See application file for complete search history.

(56) References Cited

U.S. PATENT DOCUMENTS

| | | | |
|---|---|---|---|
| 5,490,059 A | | 2/1996 | Mahalingaiah et al. |
| 5,761,517 A | | 6/1998 | Durham et al. |
| 5,794,062 A | * | 8/1998 | Baxter ................ 712/30 |
| 5,798,918 A | * | 8/1998 | Georgiou et al. ......... 700/28 |
| 5,953,237 A | | 9/1999 | Indermaur et al. |
| 5,996,083 A | | 11/1999 | Gupta et al. |
| 6,119,241 A | | 9/2000 | Michail et al. |

FOREIGN PATENT DOCUMENTS

| | | |
|---|---|---|
| JP | 10-091269 | 4/1998 |
| TW | 375711 | 12/1999 |
| TW | 541458 | 7/2003 |
| TW | 594466 | 6/2004 |

OTHER PUBLICATIONS

Seongmoo Heo et al., "Reducing Power Density through Activity Migration", ISLPED, 2003, pp. 217-222.
Preliminary Notice of the First Office Action issued Aug. 23, 2007 in a corresponding Taiwanese Patent Application.

* cited by examiner

*Primary Examiner*—William M Treat
(74) *Attorney, Agent, or Firm*—Harness, Dickey & Pierce, P.L.C.

(57) ABSTRACT

A microprocessor to reduce leakage power of execution units or reconfigurable cells, and method thereof are provided. The microprocessor may include a control unit for assigning an instruction, a plurality of execution units connected to the control unit, and a temperature sensor unit for acquiring temperature information of each of the plurality of execution units. The control unit may select one or more execution units according to the temperature information and assigns the instruction to one or more of the plurality of execution units.

22 Claims, 5 Drawing Sheets

MICROPROCESSOR FOR REDUCING LEAKAGE POWER AND METHOD THEREOF

CROSS-REFERENCE TO RELATED APPLICATIONS

This U.S. non-provisional patent application claims priority under 35 U.S.C. § 119 of Korean Patent Application 2004-00024 filed on Jan. 2, 2004, the entire contents of which are hereby incorporated by reference.

BACKGROUND OF THE INVENTION

1. Field of the Invention

The present invention relates generally to microprocessors and methods for reducing leakage power.

2. Description of the Related Art

Recently, it has been a concern to reduce power dissipation for microprocessors, which is currently being investigated in the field. As attempts are made to reduce unnecessary power dissipation in microprocessors, a source of concern in power dissipation may be the leakage process in microprocessors. Therefore, in order to form a microprocessor with reduced-power dissipation, it may be necessary to reduce the leakage power.

Leakage power may be closely related with temperature. As shown in Equation 1 (below), leakage power of a processor may increase proportionally to the exponential temperature.

$$P_{leak} = P_{leak110} \times P^{\beta(T-110)}$$ [Equation 1]

(where, $P_{leak}$ represents leakage power of a processor, $P_{leak110}$ represents leakage power at 110° C. (at the temperature of 110° C., an operation of the processor may be stopped), $\beta$ represents leakage power coefficient and T represents the current temperature).

Further, in microprocessors with a pipeline structure, an execution unit for executing an actual instruction among components of the microprocessors may be a concern as higher temperature may be achieved when executing instructions among the components of the microprocessors.

FIG. 1 is a block diagram of a conventional microprocessor with the pipeline structure. Referring to FIG. 1, the conventional microprocessor with the pipeline structure may include at least a instruction fetch block 104, a scheduling block 106, a plurality of execution units 108-1, 108-2, 108-3, ..., 108-n, and a storage unit 110.

The instruction fetch block 104 may execute an instruction fetch function. For example, the instruction fetch block 104 may predict an instruction to be executed next and then previously fetches a pertinent instruction. The scheduling block 106 may select an execution unit for executing a fetched instruction among a plurality of execution units 108-1, 108-2, 108-3, ..., 108-n and may assign the fetched instruction to the selected execution units 108-1, 108-2, 108-3, ..., 108-n. The execution units 108-1, 108-2, 108-3, ..., 108-n may then execute an assigned instruction and may store execution results in the storage unit 110.

However, in the conventional microprocessor of FIG. 1, the scheduling block 106 only decides whether the execution unit will be used or decides not to use the execution unit for executing the fetched instruction. If the execution unit may not be used, that is, an idle state, the scheduling block 106 may assign an instruction. In this case, an execution unit having a relatively high temperature may be assigned in order to execute the current instruction according to the type and frequency of the previous executional instruction. As previously mentioned, temperature may be closely related with leakage power. In other words, leakage power may be proportional to the exponential temperature. Accordingly, in case that an execution unit having a relatively high temperature may be assigned to execute an instruction, there may be unnecessary leakage power.

To reduce this leakage power, various methods have been used recently. For instance, an execution unit may be duplicated, or the leakage power may be reduced by decreasing the temperature of an execution unit by duplicating a pipeline. However, there may be problems associated with the above methods. For example, the dimensions of the microprocessor may be increased and/or the additional power dissipation due to duplication may be unavoidable.

SUMMARY OF THE INVENTION

Exemplary embodiments of the present invention provide methods and a microprocessor capable of selectively assigning a fetched instruction according to a temperature of each of a plurality of execution units.

In an exemplary embodiment of the present invention, a microprocessor for reducing leakage power includes at least a control unit for assigning an instruction, a plurality of execution units connected to the control unit, and a temperature sensor unit for acquiring temperature information of each of the execution units, wherein the control unit selects one or more execution units according to the temperature information and assigns the instruction to one or more plurality of execution units.

In another exemplary embodiment, the control unit may assign priority to a fetched instruction with the execution unit having a lower (or the lowest) temperature among the execution units.

In another exemplary embodiment, the temperature sensor unit may acquire at least one temperature of each of the execution units.

In another exemplary embodiment, the control unit may further include an instruction fetch block for fetching an instruction from an external source and a scheduling block for selecting one or more execution units according to the temperature information which assigns a fetched instruction to the one or more selected execution units.

In another exemplary embodiment, the temperature sensor unit may collect the temperature information from each of the plurality of execution units and transfers the temperature information to the scheduling block.

In another exemplary embodiment, the execution unit may be reconfigurable cells.

In yet another exemplary embodiment, the reconfigurable cell may be connected in a mesh network.

In yet another exemplary embodiment, the control unit may select some of the reconfigurable cells to combine the selected reconfigurable cells in order to execute a desired operation.

In yet another exemplary embodiment, the selected and combined reconfigurable cells may be a set of the reconfigurable cells having a lower (or the lowest) temperature among the combined reconfigurable cells.

In yet another exemplary embodiment, the set of the selected reconfigurable cells may have the most efficient structure in order to execute the operation.

In yet another exemplary embodiment, the reconfigurable cells may be include in the selected set are reconfigurable cells with an idle state.

Another exemplary embodiment of the present invention provides reconfigurable microprocessors including at least a plurality of reconfigurable cells for executing a desired function, a temperature sensor unit for collecting temperature information of the plurality of reconfigurable cells, and a control unit for selecting a set of the plurality of reconfigurable cells according to the temperature information with the lowest temperature among the plurality of reconfigurable cells Another exemplary embodiment of the present invention provides methods for reducing leakage power in a microprocessor which may include at least acquiring temperature information for each of a plurality of execution units, selecting one or more execution units according to the temperature information, and assigning an instruction to the plurality of execution units.

Another exemplary embodiment of the present invention provides a method for reducing leakage power in a reconfigurable processor which may include at least selecting reconfigurable cells with an idle state among a plurality of reconfigurable cells, and selecting a set of reconfigurable cells so as to execute a function using the reconfigurable cells, wherein the selected set of reconfigurable cells are selected according to a temperature information among the plurality of reconfigurable cells.

BRIEF DESCRIPTION OF THE DRAWINGS

Exemplary embodiments of the present invention will be readily understood with reference to the following detailed description thereof provided in conjunction with the attached drawings in which.

DETAILED DESCRIPTION OF EXEMPLARY EMBODIMENTS

Exemplary embodiments of the present invention will now be described below more fully with reference to the accompanying drawings, in which exemplary embodiments of the invention are shown. The invention may, however, be embodied in different forms and should not be constructed as limited to the embodiments set forth herein. Rather, these exemplary embodiments are provided so that this disclosure will be thorough and complete, and will fully convey the scope of the invention to those skilled in the art. Like numerals will refer to like elements throughout the specification.

Figure 1:
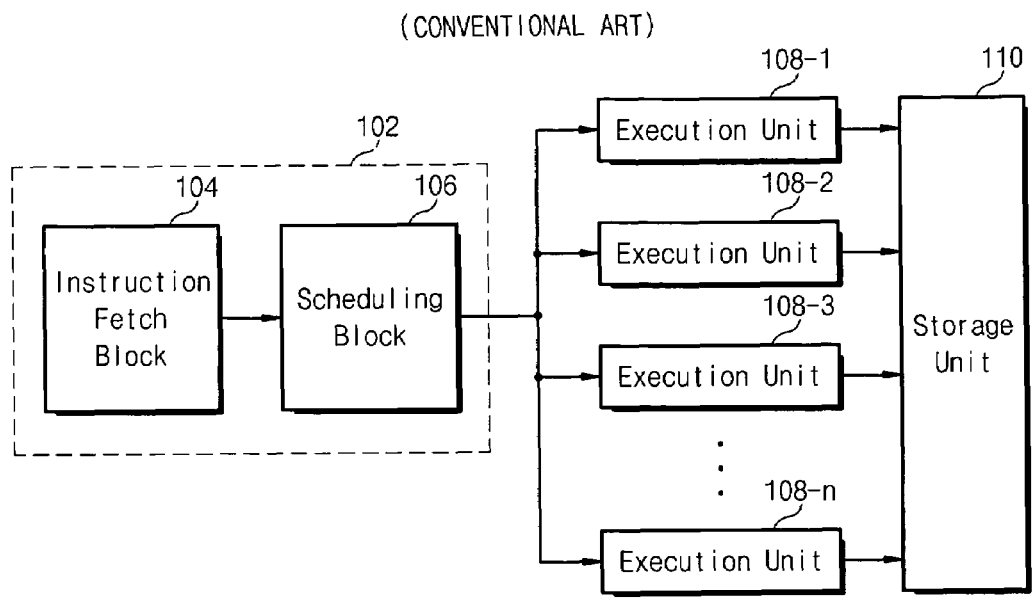
FIG. 1 is a block diagram of a conventional microprocessor with a pipeline structure.
Figure 2:
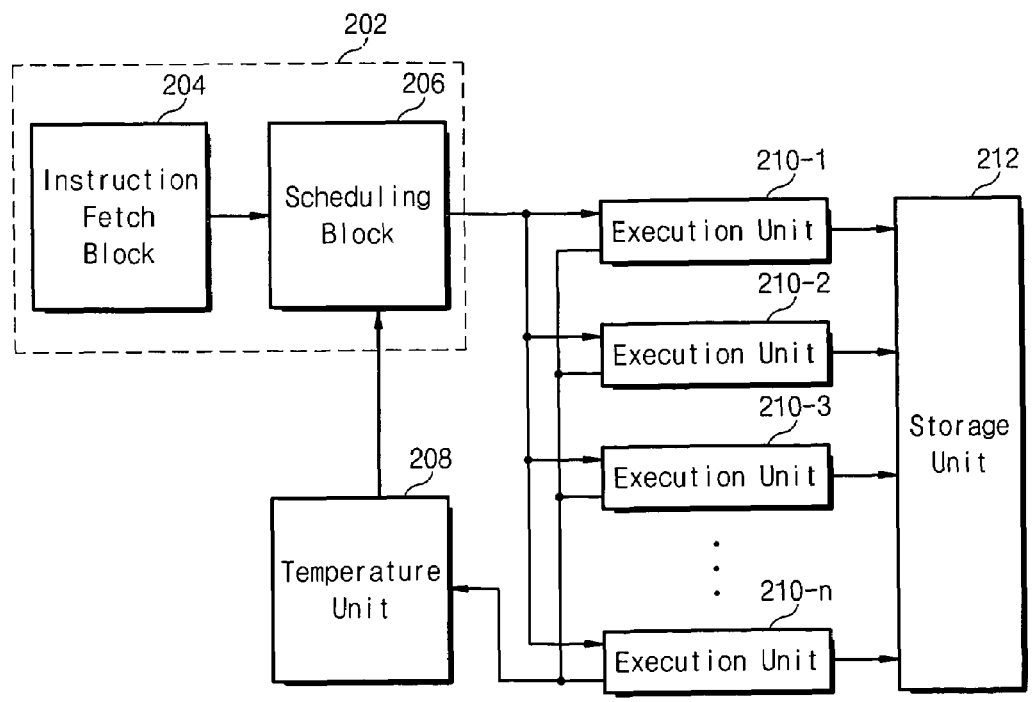
FIG. 2 is a block diagram illustrating an exemplary embodiment of a microprocessor including a temperature sensor unit according to the present invention.

FIG. 2 is a block diagram illustrating an exemplary embodiment of a microprocessor including a temperature sensor unit according to the present invention. As shown in FIG. 2, the microprocessor may include a control unit 202, a temperature sensor unit 208, a plurality of execution units 210-1, 210-2, 210-3, . . . , 210-n, and a storage unit 212.

The control unit 202 may include an instruction fetch block 204 and a scheduling block 206. The instruction fetch block 204 may predict an instruction to be next executed and fetches a pertinent instruction from an external source. The scheduling block 206 may select one of plurality of execution units 210-1, 210-2, 210-3, . . . , 210-n and may then assign a fetched instruction to a selected execution unit.

The temperature sensor unit 208 may collect temperature information from each of a plurality of execution units 210-1, 210-2, 210-3, . . . , 210-n and may transfer the temperature information to the scheduling block 206 of the control unit 202.

Execution units 210-1, 210-2, 210-3, . . . , 210-n may execute an instruction respectively assigned to execution units 210-1, 210-2, 210-3, . . . , 210-n, and may output the instruction to the storage unit 212. The storage unit 212 may store a result of the instruction executed by the execution units 210-1, 210-2, 210-3, . . . , 210-n.

When the scheduling block 206 assigns a fetched instruction to one of a plurality of execution units 210-1, 210-2, 210-3, . . . , 210-n, the scheduling block 206 may include a scheduling algorithm with respect to a selection criteria.

Figure 3:
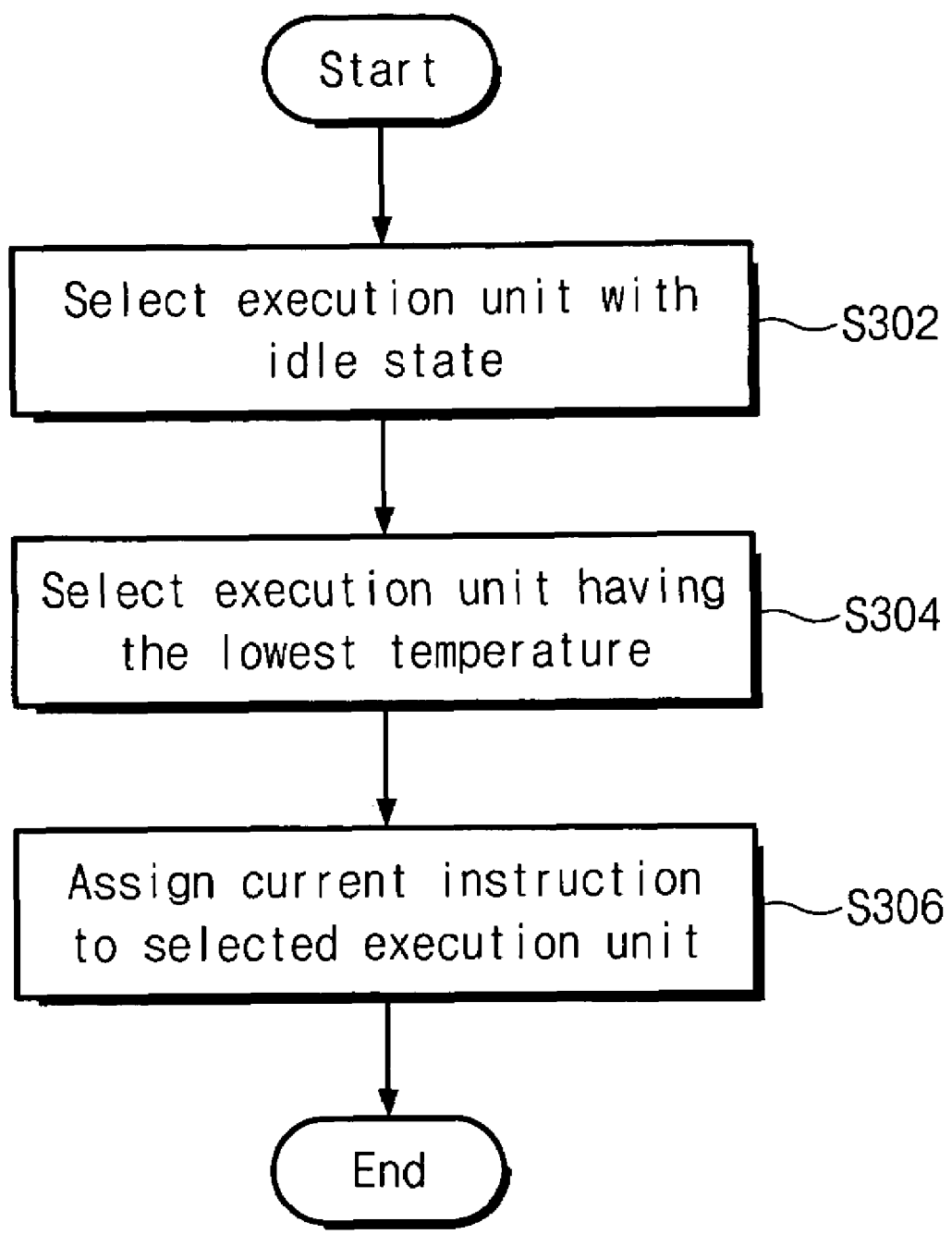
FIG. 3 is a flowchart illustrating an exemplary embodiment of a scheduling algorithm for selecting an execution unit according to the present invention.

FIG. 3 is a flowchart illustrating an exemplary embodiment of an algorithm for selecting the execution unit according to the present invention. Referring to FIG. 3, according to a method for selecting an execution unit for executing the current instruction in the microprocessor of the present invention, S302 may select an execution unit with an idle state among execution units 210-1, 210-2, 210-3, . . . , 210-n in advance. Then, in S304, the execution unit having the lowest temperature among the selected execution unit with the idle state may be selected. Then, S306 may select the execution unit to assign a current instruction.

Accordingly, when an instruction may be assigned to an execution unit, the instruction may be assigned to an execution unit having the lowest temperature by acquiring temperature information of each of execution units through the temperature sensor unit 208. As a result, it may be possible to reduce leakage power due to the accurate temperature reading on the execution unit. In addition, an instruction that may be assigned to an execution unit may not be assigned to an execution unit having the highest temperature so as to be maintained in an idle state. Accordingly, the temperature of an execution unit having the highest temperature may not be executed, and thus reduce leakage power.

In other exemplary embodiments, the method for selecting the execution unit on the basis of temperature may be more efficiently used in a processor that is reconfigurable. A reconfigurable processor may be one that is connected in a mesh network.

Figure 4:
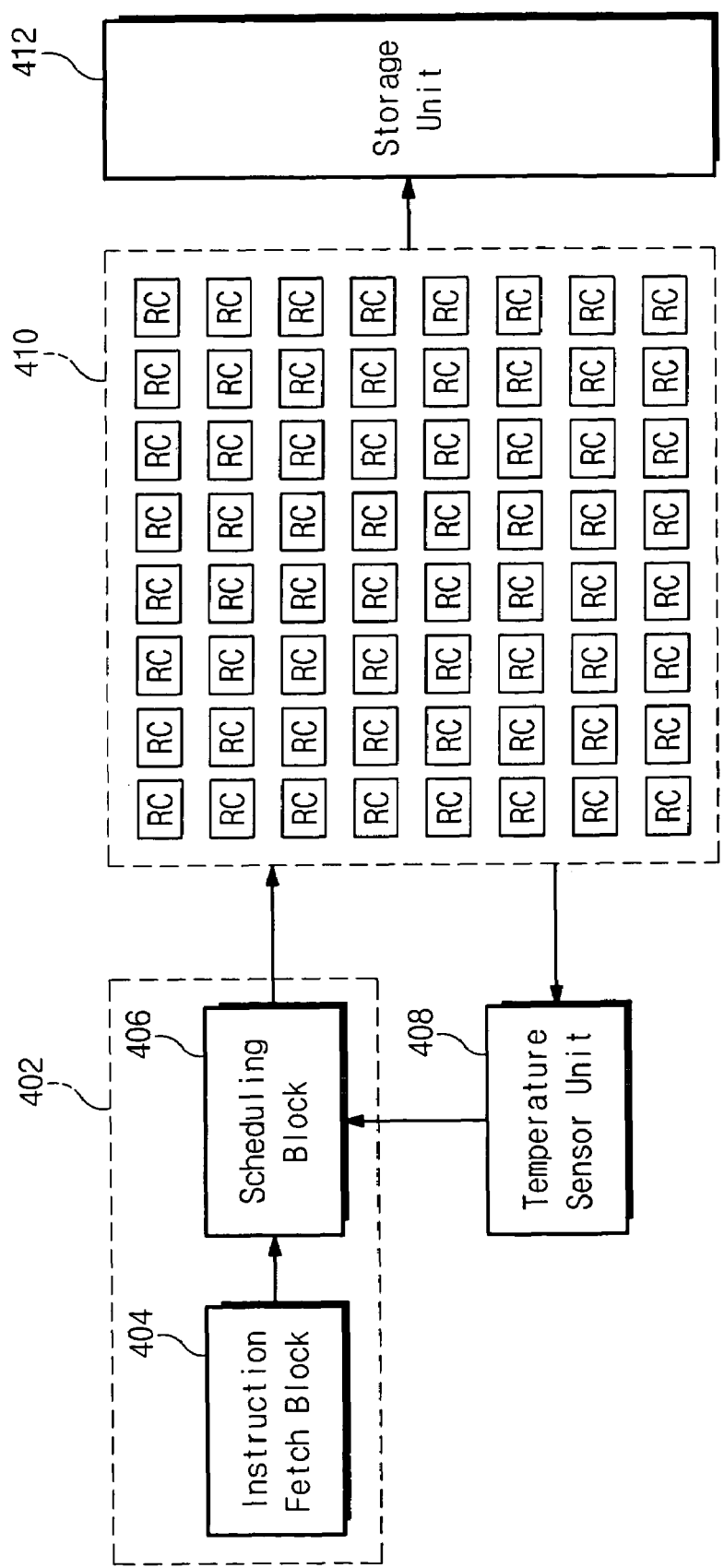
FIG. 4 is a block diagram illustrating an exemplary embodiment of a reconfigurable processor including the temperature sensor unit according to the present invention.

FIG. 4 is a block diagram illustrating another exemplary embodiment of a reconfigurable processor having a temperature sensor unit. As shown in FIG. 4, the reconfigurable processor 410 may include a plurality of reconfigurable cells RC, which may be connected in a mesh network. The reconfigurable processor 410 may be connected to at least a control unit 402, a temperature sensor unit 408, and a storage unit 212.

The control unit 402 may include an instruction fetch block 404 and a scheduling block 406. The instruction fetch block 404 may predict an instruction to be next executed and may fetch a pertinent instruction from an external source. The scheduling block 406 may select one of a plurality of reconfigurable cells RC in the reconfigurable processor 410 and may then assign a fetched instruction to a selected reconfigurable cell RC.

The temperature sensor unit 408 may collect temperature information from each of a plurality of reconfigurable cells RC and may transfers the temperature information to the scheduling block 406 of the control unit 402.

The reconfigurable processor 410 may execute an instruction respectively assigned to the reconfigurable cells RC, and may output the instruction to the storage unit 412. The storage unit 412 may store a result of the instruction executed by the reconfigurable cells RC.

Figure 5:
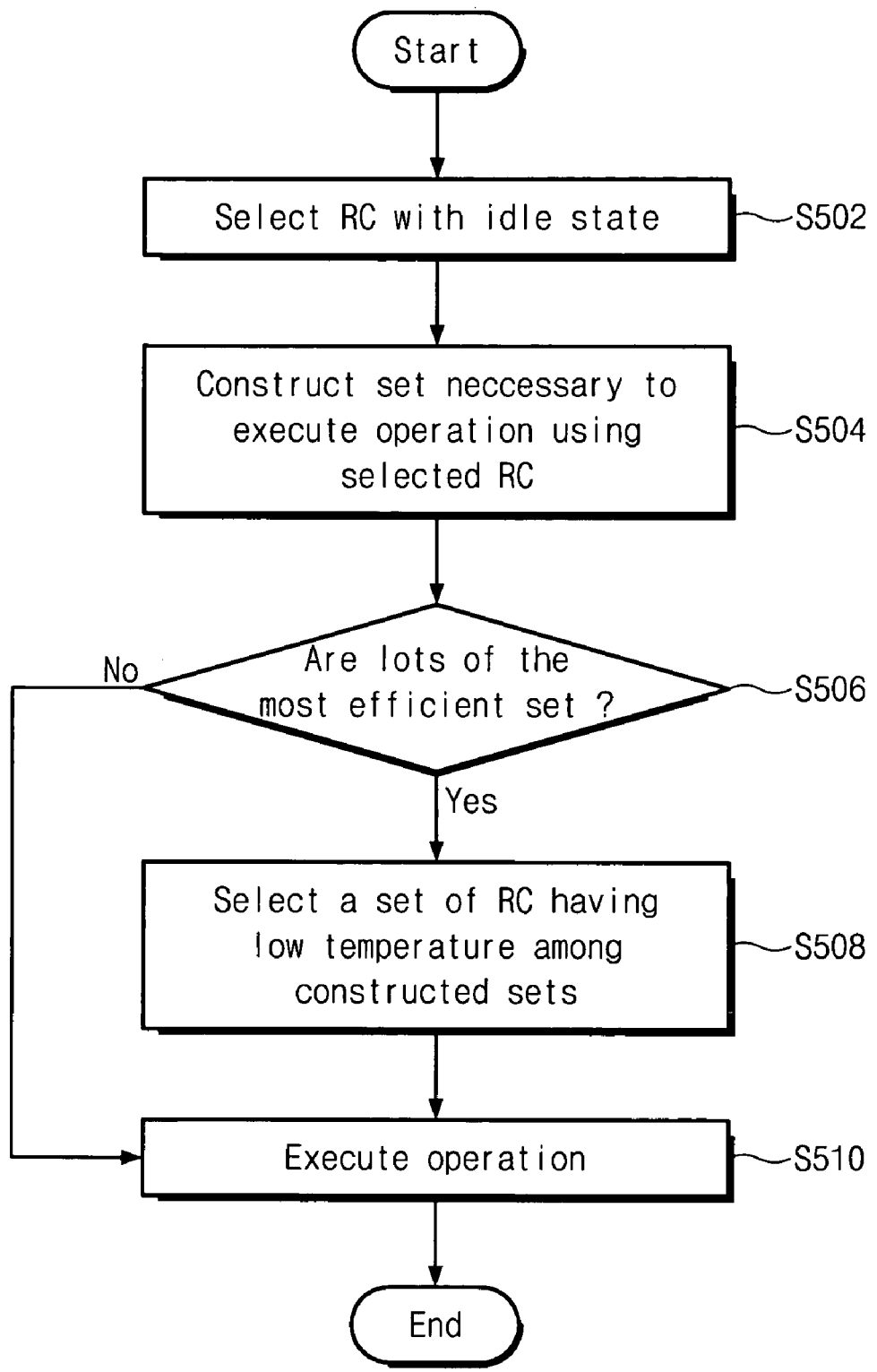
FIG. 5 is a flowchart illustrating an exemplary embodiment of a scheduling algorithm for selecting reconfigurable cells in the reconfigurable processor according to the present invention.
Figure 6A:
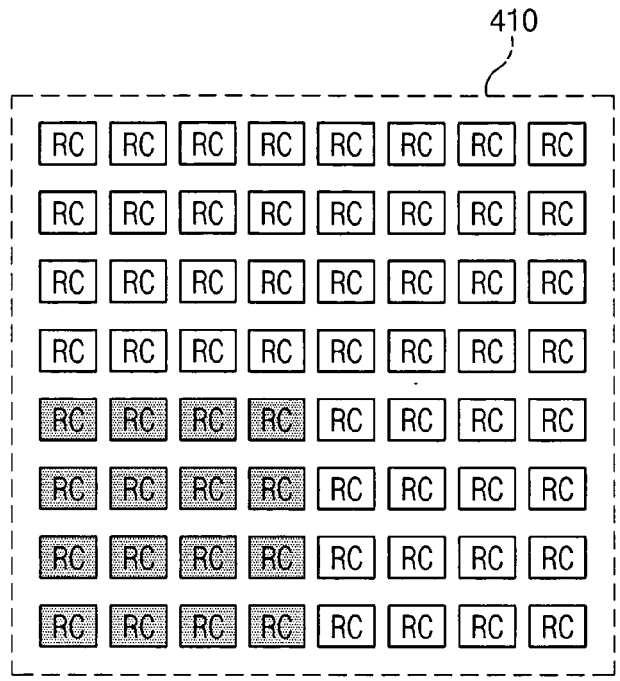
FIGS. 6(*a*) and 6(*b*) illustrates an exemplary embodiment of reconfigurable cells selected so as to execute a 4×4 matrix in the reconfigurable processor of FIG. 5.
Figure 6B:
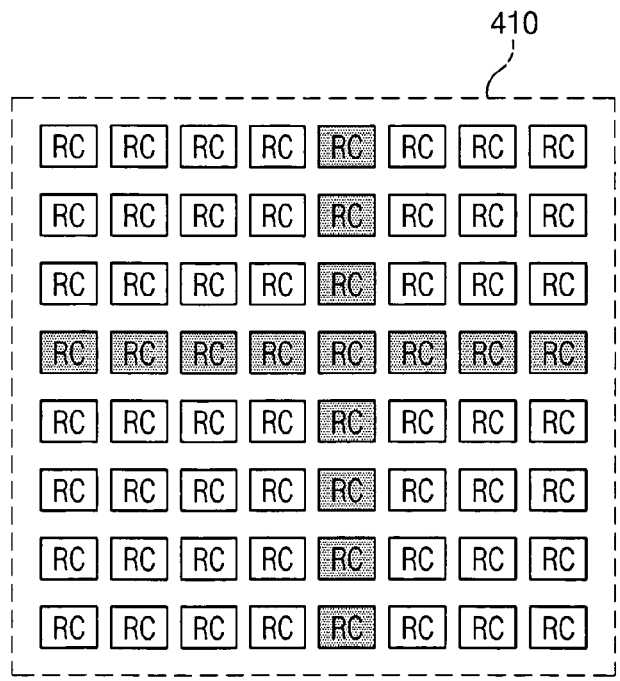

FIG. 5 is a flowchart illustrating an exemplary embodiment of a scheduling algorithm for selecting the RC in the reconfigurable processor 410. Referring to FIG. 5, S502 may select the RC with an idle state. Then in S504, a set of the RC capable of forming a structure in the most efficient manner may execute an instruction that may be constructed among selected RC with the idle state. For example, but not limited to, in case that 4×4 matrix operation may be executed, it may be efficient to group the RC in four by four across and down, respectively, as shown in FIG. 6(a). As shown in FIG. 6(b), if the RC may be grouped in one across and eight down, a reciprocal connection of each of the RC may become complex. As a result, S506 may decide whether sufficient amount of time may be required in executing an operation. If sufficient amount of time may be require, then the operation may proceed to S508 which may select a set of RC having the lowest temperature among the selected set. If however, no sufficient time may be required, then the operation may execute an operation in S510 on the basis of temperature information of each of the RC collected by the temperature sensor unit 408.

Thus, according to the exemplary processors of the present invention, it may be possible to reduce leakage power by selecting an execution unit or reconfigurable cell according to the temperature information. Accordingly, selecting the temperature of an execution unit or reconfigurable cells, which may be the highest temperature, may be reduced.

It should be appreciated that "microprocessor" or "processor" of the above exemplary embodiments may be or be part of any "system", as would be known to one of ordinary skill in the art.

It should be further appreciated that "at least one temperature" of the plurality of execution units acquired by the temperature sensor unit may be measured by averaging the temperature of the execution units, by measuring only a sample (e.g., more than two) of execution units, by measuring the instantaneous temperature of the each of the plurality of execution units or by any other combination of measurements as would be known to one of ordinary skill in the art.

It should be further appreciated that the "assigned instruction" by the control unit to the execution units may be divided into sub-units as would be known to one of ordinary skill in the art.

Although the present invention has been described in connection with the embodiment of the present invention illustrated in the accompanying drawings, it is not limited thereto. It will be apparent to those skilled in the art that various substitution, modifications and changes may be thereto without departing from the scope and spirit of the invention.

What is claimed is:

1. A microprocessor, comprising:
   a control unit for assigning an instruction;
   a plurality of execution units connected to the control unit; and
   a temperature sensor unit for acquiring temperature information of each of the plurality of execution units,
   wherein the control unit determines a priority for each execution unit by selecting at least one execution unit with an idle state among the plurality of execution units, the selected execution unit is based on lowest temperature information, and the control unit assigns the instruction to the selected execution unit.

2. The microprocessor according to claim 1, wherein the control unit further comprises:
   an instruction fetch block for fetching an instruction from an external source; and
   a scheduling block for selecting one or more execution units according to the temperature information and assigning the fetched instruction to the selected execution unit.

3. The microprocessor according to claim 2, wherein the temperature sensor unit collects the temperature information from each of the plurality of execution units and transfers the temperature information to the scheduling block.

4. The microprocessor according to claim 1, wherein the plurality of execution units are reconfigurable cells.

5. The microprocessor according to claim 4, wherein the reconfigurable cells are connected in a mesh network.

6. The microprocessor according to claim 4, wherein the control unit selects and combines some of the reconfigurable cells to execute a desired operation.

7. The microprocessor according to claim 6, wherein the selected reconfigurable cells are the reconfigurable cells having the lowest temperature among the combined reconfigurable cells.

8. The microprocessor according to claim 7, wherein the selected and combined reconfigurable cells have the most efficient structure in order to execute the operation.

9. The microprocessor according to claim 8, wherein some of the reconfigurable cells included in the selected set of reconfigurable cells are reconfigurable cells with the idle state.

10. A reconfigurable microprocessor, comprising:
    a plurality of reconfigurable cells for executing a desired function;
    a temperature sensor unit for collecting temperature information of the plurality of reconfigurable cells; and
    a control unit for determining a priority for the plurality of reconfigurable cells by selecting at least one reconfigurable cell with an idle state among the plurality of reconfigurable cells, determining a set of reconfigurable cells using the selected reconfigurable cell with the idle state, and selecting a set of reconfigurable cells among the determined set of reconfigurable cells so as to execute the desired function, the selected set of reconfigurable cells among the determined set of reconfigurable cells are based on lowest temperature information.

11. The reconfigurable microprocessor according to claim 10, wherein the plurality of reconfigurable cells is formed in a mesh network.

12. The reconfigurable microprocessor according to claim 10, wherein the set of reconfigurable cells selected by the control unit has the most efficient structure to execute the function.

13. A method for reducing leakage power, comprising:
    acquiring temperature information for each of a plurality of execution units;
    determining a priority for each of the plurality of execution units;
    selecting at least one execution unit with an idle state among the plurality of execution units, the selected execution unit is based on lowest temperature information; and
    assigning an instruction to the selected execution unit.

14. The method according to claim 13, further comprising providing a temperature sensor unit to acquire the temperature information for each of the plurality of execution units.

15. The method according to claim 13, wherein the control unit further comprises:
fetching an instruction from an external source;
selecting one or more execution units according to the temperature information; and
assigning the fetched instruction to the selected execution unit.

16. The method according to claim 15, wherein a temperature sensor unit collects the temperature information from each of the plurality of execution units and transfers the temperature information to a scheduling block.

17. A microprocessor for performing the method of claim 13.

18. A method for reducing leakage power, comprising:
providing a plurality of reconfigurable cells;
selecting at least one reconfigurable cell with an idle state among the plurality of reconfigurable cells;
determining a set of reconfigurable cells using the selected reconfigurable cell with the idle state; and
selecting a set of reconfigurable cells among the determined set of reconfigurable cells so as form a structure to execute a function, wherein the selected set of reconfigurable cells among the determined set of reconfigurable cells are selected based on lowest temperature information.

19. The method according to claim 18, wherein the selected set of reconfigurable cells has the most efficient structure to execute the function.

20. The method according to claim 19, wherein the executed function is performed once so that executing the function is assigned to the selected set of reconfigurable cells.

21. The method according to claim 18, wherein the reconfigurable cells are connected in a mesh network.

22. A reconfigurable processor for performing the method of claim 18.

\* \* \* \* \*